United States Patent [19]
Lindgren et al.

[11] Patent Number: 5,420,421
[45] Date of Patent: May 30, 1995

[54] WIDE DYNAMIC RANGE NON-UNIFORMITY COMPENSATION FOR INFRARED FOCAL PLANE ARRAYS

[75] Inventors: Gary M. Lindgren, Agoura; Joseph A. Spagnolia, Canoga Park; Anthony J. Kay, Moorpark, all of Calif.

[73] Assignee: Hughes Aircraft Company, Los Angeles, Calif.

[21] Appl. No.: 322,116

[22] Filed: Oct. 12, 1994

Related U.S. Application Data

[63] Continuation of Ser. No. 986,304, Dec. 7, 1992, abandoned.

[51] Int. Cl.⁶ .................... G01R 31/27; G01M 19/00; H01L 27/146
[52] U.S. Cl. .................................................. 250/252.1
[58] Field of Search .............................. 250/252.1 A

[56] References Cited
U.S. PATENT DOCUMENTS
5,128,884  7/1992  Prager ........................... 364/571.03

FOREIGN PATENT DOCUMENTS
90/09076  8/1990  WIPO .

*Primary Examiner*—Constantine Hannaher
*Attorney, Agent, or Firm*—Charles D. Brown; Randall M. Heald; Wanda K. Denson-Low

[57] ABSTRACT

A method and apparatus for non-uniformity compensation for infrared focal plane arrays in an infrared imaging device (10) including a calibration operation and a correction operation. The calibration operation measures the response (24) generated by the detector elements (14) in the focal plane array (16) to a wide range of known signal flux levels of infrared radiation (22) produced by a uniform black body under controlled conditions. The responses (24) are then stored as a digital video signal (27) in a look-up table memory (38). The correction operation achieves the near real-time compensation of a second response of the detector element (14) to the signal flux level of infrared radiation (22) produced by objects in the field of view surveyed by the imaging device (10) by comparing the second response to the stored digital video signals (27) and interpolates the second response to a corrected digital video output signal (31).

7 Claims, 2 Drawing Sheets

WIDE DYNAMIC RANGE NON-UNIFORMITY COMPENSATION FOR INFRARED FOCAL PLANE ARRAYS

This is a continuation application of Ser. No. 07/986,304, filed Dec. 7, 1992, abandoned.

BACKGROUND OF THE INVENTION

1. Technical Field

The present invention relates generally to infrared imaging devices and, more particularly, to a method and apparatus for compensating for the nonuniformity of response of the detector elements of an infrared focal plane array.

2. Discussion

Infrared imaging devices convert invisible infrared energy into useful forms such as visible images. This is accomplished by first detecting infrared radiation which is emitted or reflected from objects in a field of view and then producing resultant data corresponding to the signal flux level of the infrared radiation that is detected. Generally, infrared imaging devices include an optical system for receiving the infrared radiation, detector elements, such as in a focal plane array, for producing a response corresponding to the signal flux level of the infrared radiation received through the optical system, an electronics unit for processing the response produced by the detector elements and generating a corresponding digital output, and may also include an output display unit, such as a cathode-ray tube (CRT), for displaying a resultant visible image, if desired.

The operation of an infrared imaging device may generally be described as follows: the optical system surveys a field of view and causes infrared radiation to be directed toward the detector elements, each of which correspond to discrete points, or pixels; each detector element then generates an analog response, such as a voltage or current, corresponding to the signal flux level of the infrared radiation received by that detector element; the analog response is then processed in the electronics unit which produces a digital signal output; and, finally, the output is converted into a useable form, such as a visible image generated by an output display unit. Typically, this procedure is continuously repeated for generating a series of useable data in near real-time, depending upon the imaging application desired to be performed.

However, through experience it has been learned that because each individual detector element in a focal plane array is not identical, each detector element may produce a different response to a given signal flux level of infrared radiation that it receives. That is, a detector element "A" and a detector element "B" may be exposed to the same signal flux level of infrared radiation, however, each detector element may generate a unique analog response. In addition, the converse may also be true. That is, a detector element "A" and a detector element "B" may be exposed to different signal flux levels of infrared radiation, however, each detector element may generate the same analog response. This phenomenon is well-known as "non-uniformity of response" or, simply, "non-uniformity." It has also been learned that the relationship between the response produced by a detector element in relation to various signal flux levels of infrared radiation is non-linear.

Consequently, infrared imaging devices must compensate for the variations between detector elements and correct them to an "absolute scale" in order to produce consistent and reliable image data.

A means to accomplish the necessary "non-uniformity compensation" so that accurate image data may be generated by the infrared imaging device has been to calibrate each detector element in the focal plane array with the electronics unit. In this manner, the electronics unit produces a "corrected" digital signal output which reflects a "normalized" value for the signal flux level of infrared radiation that is received by a given detector element. Typically, non-uniformity compensation has been accomplished by the use of a two-point or a four-point calibration method having analog gain and offset adjustments. However, this technique has presented the disadvantage of allowing the analog response of any particular detector element to be compensated for non-uniformity only over a narrow dynamic range of signal flux levels of infrared radiation. Therefore, previous non-uniformity compensation schemes have been inadequate where the field of view of the imaging device has contained a wide dynamic range of signal flux levels of infrared radiation, such as a "cold" sky and a "hot" terrain.

In light of the forgoing discussion, it is a principal object of the present invention to provide a method and apparatus for non-uniformity compensation for use in the focal plane array of an infrared imaging device capable of compensating for non-uniformity over a wide dynamic range of signal flux levels of infrared radiation. In addition, it is another object of the present invention to provide a focal plane array uniform response which can be calibrated as an absolute radiometer.

SUMMARY OF THE INVENTION

According to the teachings of the present invention, a method and apparatus for non-uniformity compensation for infrared focal plane arrays of an infrared imaging device is described as including a calibration operation and a correction operation. The calibration operation measures the responses generated by the detector elements in the focal plane array to a wide range of known signal flux levels of infrared radiation that are produced by a uniform black body in a controlled environment. The responses are then stored in a data storage device. The correction operation compensates a second response of the detector element to the signal flux level of infrared radiation produced by objects in the field of view surveyed by the imaging device by comparing the second response to the set of first responses and interpolating the second response to a corrected value.

The present invention is expected to provide non-uniformity compensation for infrared focal plane array response over a wide dynamic range of signal flux levels of infrared radiation, such as a "cold" sky and "hot" terrain. In addition, the present invention is expected to be capable of being performed in near real-time. Further, the non-uniformity compensation of the present invention can provide focal plane array response which can be calibrated as an absolute radiometer. Still further, it is believed that the present invention will enable robust target acquisition and tracking capability to be achieved in infrared imaging devices, which is necessary for those infrared imaging devices used in air-to-air missile applications (i.e. seekers).

BRIEF DESCRIPTION OF THE DRAWINGS

The various features and advantages of the present invention will become apparent to one skilled in the art upon reading the following specification, in which.

DESCRIPTION OF THE PREFERRED EMBODIMENT

It should be understood from the outset that while the following discussion illustrates a particular embodiment of the present invention, this embodiment merely represents a best mode of currently practicing the invention and other modifications may be made to the particular embodiment without departing from the spirit and scope of the invention.

Figure 1:
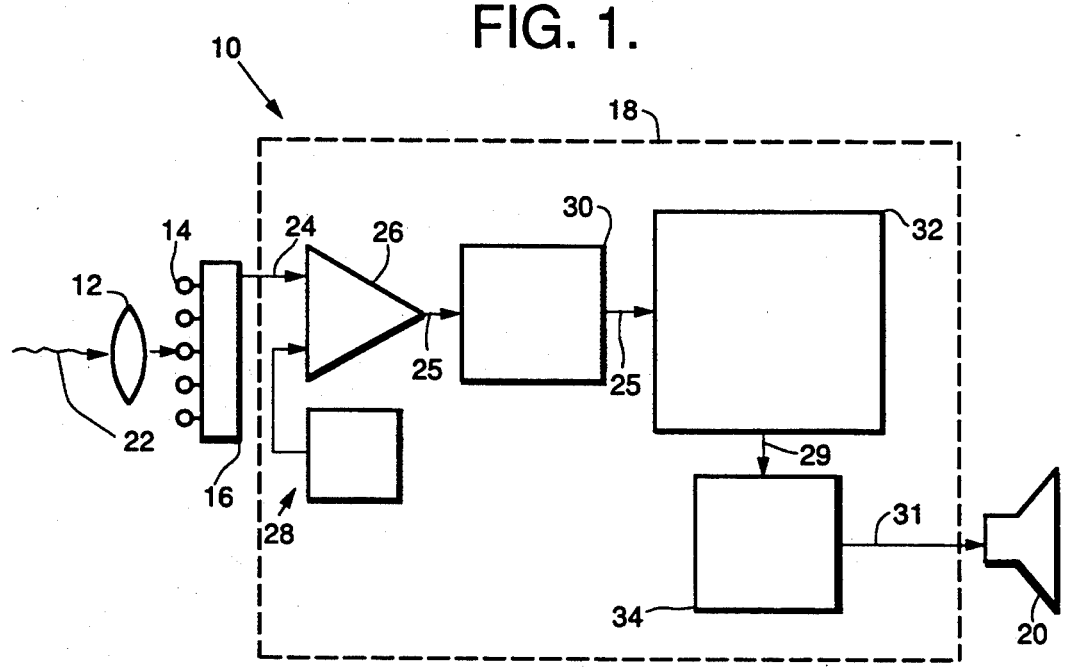
FIG. 1 is a simplified block diagram illustrating an infrared imaging device incorporating the non-uniformity compensation for infrared focal plane arrays of the present invention.
Figure 2:
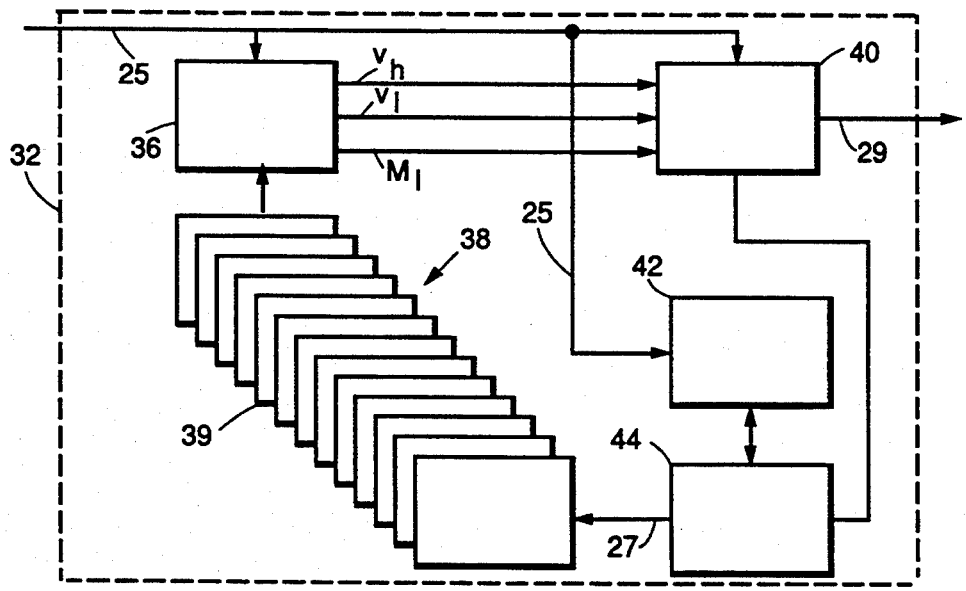
FIG. 2 is a simplified block diagram further illustrating the compensation unit of the infrared imaging device of FIG. 1.

Referring now to FIGS. 1 and 2, an infrared imaging device 10 incorporating the non-uniformity compensation for infrared focal plane arrays of the present invention is illustrated. As previously described and as shown in the simplified block diagram of FIG. 1, the infrared imaging device 10 generally may include an optical system 12, detector elements 14 in a focal plane array 16, an electronics unit 18 and an output display unit 20. As the optical system 12 surveys a field of view, infrared radiation 22 is received at each detector element 14 in the focal plane array 16. In turn, each detector element 14 generates an analog response 24, such as a current or voltage, corresponding to the signal flux level of the infrared radiation 22 that it receives. The analog response 24 is then processed through the electronics unit 18 to ultimately produce an analog video output signal 31 that is converted into a visible image by the output display unit 20.

As shown in FIG. 1, the electronics unit 18 includes an amplifier 26, an offset adjustment 28, an analog-to-digital converter 30, a compensation unit 32 and a scan converter 34. As further illustrated in FIG. 2, the compensation unit 32 includes a comparator 36, look-up table memory 38, an interpolator 40, a memory buffer 42 and a CPU 44.

As will be further described herein, the nonuniformity compensation for infrared focal plane arrays of the present invention may be best understood as encompassing both a calibration operation and a correction operation.

CALIBRATION

As already discussed, the analog response 24 of an individual detector element 14 in the focal plane array 16 to a given signal flux level of infrared radiation 22 is not uniform and may vary detector element 14 to detector element 14. In addition, other factors such as the period of time that the detector element 14 is exposed to the infrared radiation 22, or integration time, the bias voltage setting of the detector element 14 in the focal plane array 16 and the ambient temperature of the environment in which the detector element 14 operates, also affect the analog response 24 generated by the detector element 14. The purpose of the calibration operation of the present invention is, therefore, to determine the variations in the analog response 24 of each detector element 14 in the focal plane array 16 over a wide-range of signal flux levels of infrared radiation 22 in a controlled environment, so that these variations may be recorded for later use in the near real-time correction operation of the present invention.

Referring once again to FIG. 1, during the calibration operation, the infrared imaging device 10 is exposed to a uniform black body (not shown) which uniformly emits a known signal flux level of infrared radiation 22. Each detector element 14 in the focal plane array 16, therefore, receives the infrared radiation 22 and generates an analog response 24. As each detector element 14 generates a response 24, the response 24 is subsequently carried to the electronics unit 18. At the electronics unit 18, the analog response 24 is first amplified 26 and offset 28 to match the analog-to-digital converter 30. In a well-known manner at the analog-to-digital converter 30, the analog response 24 is converted into a digital video signal 25, which may be a digital word nominally twelve bits wide, for example.

Next, the digital video signal 25 is carried to the compensation unit, shown as block 32 in FIGS. 1 and 2. As best illustrated in FIG. 2, at the compensation unit 32 the incoming digital video signal 25 is directed to the memory buffer 42, where it is temporarily stored. For the purpose of enhancing the accuracy of the calibration operation, the focal plane array 16 is exposed to the infrared radiation 22 from the uniform black body (not shown) over several integration times, or over multiple "frames." Thus, multiple digital video signals 25 are generated, each corresponding to an analog response 24 of the detector element 14 for a separate frame, and are recorded in the memory buffer 42. These digital video signals 25 are then averaged by the CPU 44 so as to reduce the negative effect of any background radiation, or noise, which may influence the value of each analog response 24 generated by the detector element 14, to a desired level. It has been found that sixteen separate frames sufficiently reduce such temporal noise. However, depending upon the amount of background noise which may adversely affect the analog responses 24 of the detector element 14, greater or fewer frames may be required. It is important to note that during an integration time, the bias voltage and ambient temperature of the focal plane array 14 are held to a known constant value. In this manner, an "absolute scale" may be generated for the focal plane array 16 against which the later, individual analog responses 24 of the detector elements 14 may be measured in near real-time during the correction operation.

The resultant average digital video signal 27 is then retrieved from the memory buffer 42 by the CPU 44 and is stored in the look-up table memory 38. It should be appreciated that the calibration operation is repeated, as desired, over a range of infrared radiation signal flux levels by varying the signal flux level of the infrared radiation emitted by the uniform black body. It has been determined that as many as sixteen separate signal flux levels of infrared radiation, or more, may be desired to achieve the wide dynamic range of nonuniformity compensation of the present invention. Further, it is important to note that the range of infrared signal flux level values over which the focal plane array is calibrated generally depends upon the specific requirements that are desired to be met by the infrared imaging device. For example, it may be desired that the infrared imaging device have the capability to operate over a wide range of signal flux levels of infrared radiation yet maintain a resolution between two particular values of signal flux that is greater than the resolution over the entire range of signal flux.

The calibration operation is repeated so that a an average digital video signal 27 for each detector element 14 in the focal plane array 16, at each of the desired levels of infrared radiation 22 signal flux, is stored in the look-up table memory 38. Upon completion of the calibration operation, therefore, the look-up table memory 38 holds an "absolute data set" of digital video signals 27 of the detector elements 14 in the focal plane array 16. As shown in FIG. 2, the look-up table memory 38 has sixteen pages 39, each page 39 containing the average digital video signal 27 for every detector element 14 in the focal plane array 16 at a particular signal flux level of infrared radiation 22.

Figure 3:
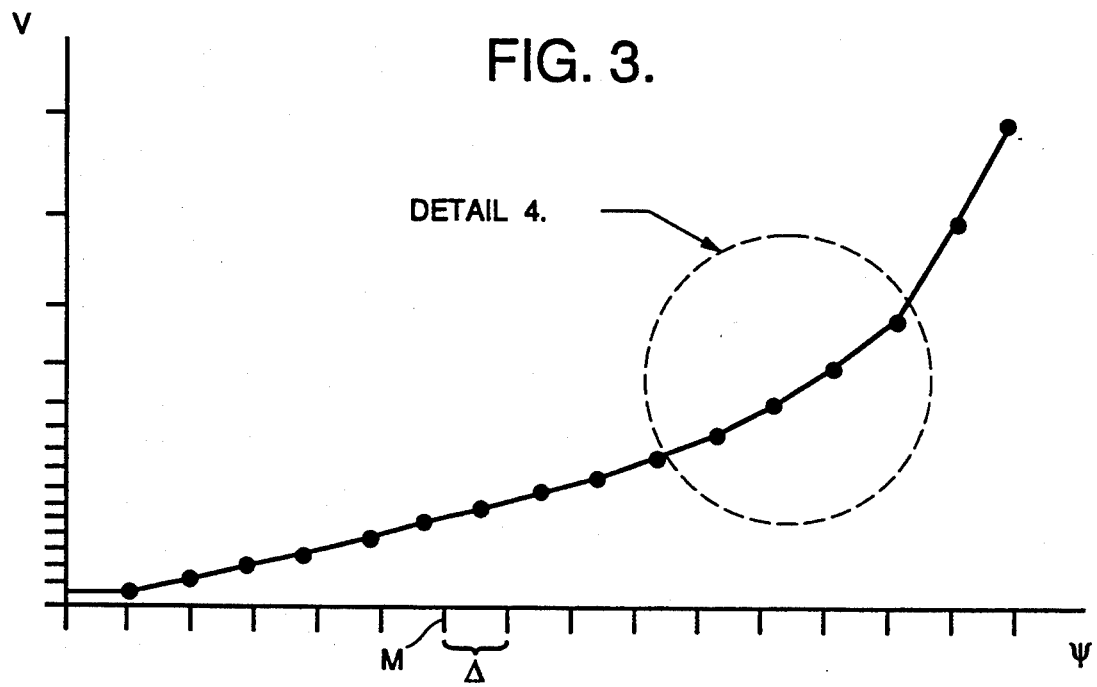
FIG. 3 is a simplified graph showing the non-linear response curve of an individual detector element in the focal plane array calibrated over a wide range of signal flux levels of infrared radiation which have been linearly normalized.

With reference now to FIG. 3, a simplified graph of the response curve of an individual detector element 14 in the focal plane array 16, after completion of the calibration operation over a wide range of signal flux levels of infrared radiation 22, is shown. It should be noted that the response v of the detector element 14 generally increases in relation to the increase in the signal flux level of infrared radiation $\Psi$ to which it is exposed, at a non-linear rate. It should be further noted that FIG. 3 shows the signal flux levels $\Psi$ to be normalized; that is, the actual values of the levels of infrared radiation signal flux $\Psi$ have been transposed or "mapped" to different values. Here, the signal flux $\Psi$ has been normalized linearly. It should be appreciated that the normalization of signal flux values of infrared radiation is well known in the art and may vary depending upon the desired results to be achieved by the imaging device. Thus, after normalization, there are sixteen "mapped" signal flux levels M. In FIG. 3, because the normalization is linear, each of the mapped values is separated by a constant value delta $\Delta$.

In addition to the signal flux level of infrared radiation 22 to which the detector elements 14 in the focal plane array 16 are exposed, it should be appreciated that the other factors, such as the integration time, bias voltage and/or ambient temperature, may be varied in any combination during the calibration operation to compile an extremely wide ranged "absolute data set" for storage in the look-up table memory 38. Again it should be appreciated that the decision as to which of the above mentioned factors should vary and which should be constant, as well as their actual values, will depend upon the operating specifications or parameters required to be met by the infrared imaging device.

CORRECTION

In use, the non-uniformity compensation of the present invention is implemented in an infrared imaging device by means of a near real-time correction operation. As already described, an analog response 24 is generated by each detector element 14 in the focal plane array 16 which corresponds to the signal flux level of infrared radiation 22 that it receives. The response 24 is carried to the electronics unit 18 and is converted to a digital video signal 25, as mentioned earlier. At this point, however, the digital video signal 25 is carried to the compensation unit 32 and the correction operation of the present invention is initiated.

Turning once again to FIG. 2, the digital video signal 25 is shown to be carried simultaneously to the comparator 36 and the interpolator 40. At the comparator 36, the incoming digital video signal 25 corresponding to the response 24 of a detector element, i, is compared with the stored average digital video signals v for that detector element 14 in the pages 39 of data stored in the look-up table memory 38 during the calibration operation. Upon comparison, the comparator 36 identifies the stored values v for the detector element i which bound the incoming digital video signal 25. That is, as shown in FIG. 4, the comparator 36 determines the stored value v that is greater than, $v_h$, and the stored value that is less than, $v_l$, the incoming digital video signal 25.

Figure 4:
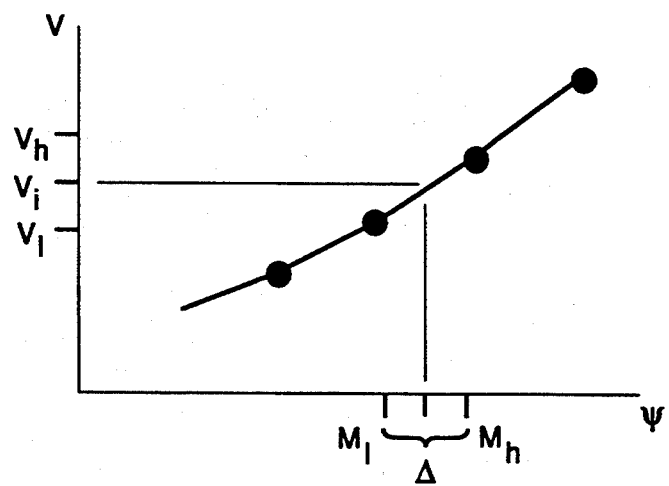
FIG. 4 details a portion of the simplified graph of FIG. 3.

As shown by FIGS. 2 and 4, output from the comparator 36, $v_h$, $v_l$ and $M_l$, are carried to the interpolator 40. At the interpolator 40, the digital video signal 25 is corrected for non-uniformity to a compensated digital video output signal 29 according to the following equation:

Compensated Output $29 = M_l + [(v_i - v_l)/(v_h - v_l)]\Delta$

Although the above equation uses linear interpolation, any form of mathematical interpolation may be used, depending upon the accuracy required in the non-uniformity compensation operation.

At this point, the compensated digital video output signal 29 is carried to a scan converter 34 where it is converted back into an analog video signal 31 in a well-known manner. From the scan converter 34, the compensated video output signal 31 leaves the electronics unit 18 and is carried as input to the output display unit 20. At the output display unit 20, the compensated video output signal 31 is converted into a visible image in a well-known manner.

It should be understood that the correction operation of the present invention is continuously repeated as each detector element in the focal plane array generates a response to the signal flux level of infrared radiation that it receives.

The present invention is expected to provide non-uniformity compensation for infrared focal plane array response over a wide dynamic range of signal flux levels of infrared radiation, such as a "cold" sky and "hot" terrain. In addition, the present invention is expected to be capable of being performed in near real-time. Further, the non-uniformity compensation of the present invention can provide focal plane array response which can be calibrated as an absolute radiometer. Still further, it is believed that the present invention will enable robust target acquisition and tracking capability to be achieved, which is necessary for infrared imaging devices used air-to-air missile applications (i.e. seekers).

Various other advantages and modifications will become apparent to one skilled in the art after having the benefit of studying the teachings of the specification, the drawings, and the following claims.

What is claimed is:

1. A method for non-uniformity compensation for an infrared imaging device having a plurality of detector elements arranged in a focal plane array, said method comprising a calibration operation and a correction operation, said calibration operation comprising measuring a plurality of first responses that are generated by each of said plurality of detector elements to each of a plurality of known signal flux levels of infrared radiation over a wide range;

generating a corresponding data set of first responses for each of said plurality of detector elements in said focal plane array;

storing each said corresponding data set of first responses for each of said plurality of detector elements in a data storage location; and transposing each of said plurality of known signal flux levels of infrared radiation to other values according to a predetermined relationship; and said correction operation comprising measuring a second response that is generated by each of said plurality of detector elements in said focal plane array to at least one unknown signal flux level of infrared radiation that is produced by at least one object in a field of view;

comparing each said second response with each said corresponding data set of first responses for each of said plurality of detector elements in said focal plane array;

interpolating within each said corresponding data set of first responses for each of said plurality of detector elements in said focal plane array to determine a compensated output corresponding to said unknown signal flux level of infrared radiation detected by each of said plurality of detector elements in said focal plane array.

2. The method of claim 1 wherein said wide range of known signal flux levels of infrared radiation comprises at least sixteen different signal flux levels of infrared radiation.

3. The method of claim 1 wherein said interpolating is achieved by mathematical linear interpolation.

4. A method for non-uniformity compensation for the focal plane array of an infrared imaging device comprising the steps of:

(a) providing a plurality of detector elements arranged in a focal plane array;

(b) causing said plurality of detector elements in said focal plane array to detect a known signal flux level of infrared radiation being produced by a uniform black body in a controlled environment;

(c) measuring a first response to said known signal flux level of infrared radiation that is generated by a detector element in said focal plane array over a predetermined time period;

(d) storing said first response in a first data storage location;

(e) repeating steps (c) and (d) for a plurality of said time periods for creating a plurality of stored first responses;

(f) averaging said plurality of stored first responses for creating a response average;

(g) storing said response average in a second data storage location;

(h) repeating steps (c), (d), (e), (f) and (g) for each of said plurality of detector elements in said focal plane array;

(i) transposing said known signal flux level of infrared radiation to another value according to a predetermined relationship;

(j) repeating steps (h) and (i) for a plurality of known signal flux levels of infrared radiation over a wide range for creating a corresponding data set of response averages for each of said plurality of detector elements in said focal plane array;

(k) causing said plurality of detector elements in said focal plane array to detect at least one unknown signal flux level of infrared radiation being produced by at least one object in a field of view in real-time;

(l) measuring a second response to said unknown signal flux level of infrared radiation that is generated by a detector element in said focal plane array;

(m) comparing said second response with said corresponding data set of response averages for said detector element;

(n) interpolating within said corresponding data set of response averages to determine a compensated output corresponding to said unknown signal flux level of infrared radiation; and (o) repeating steps (l), (m) and (n) for each of said plurality of detector elements in said focal plane array.

5. The method of claim 4 wherein said plurality of time periods of step (e) is at least sixteen.

6. The method of claim 4 wherein said plurality of known signal flux levels of infrared radiation over a wide range of step (i) includes at least sixteen different signal flux levels of infrared radiation.

7. The method of claim 4 wherein step (m) is comprising mathematical linear interpolation.

* * * * *